(12) United States Patent
Schmitz (10) Patent No.: US 9,578,962 B2
(45) Date of Patent: *Feb. 28, 2017

(54) TRANSLATING STOWAGE BIN AND METHOD OF ASSEMBLY

(71) Applicant: The Boeing Company, Huntington Beach, CA (US)

(72) Inventor: Chad D. Schmitz, Arlington, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/884,308

(22) Filed: Oct. 15, 2015

(65) Prior Publication Data

US 2016/0029785 A1    Feb. 4, 2016

Related U.S. Application Data

(63) Continuation-in-part of application No. 13/971,552, filed on Aug. 20, 2013, now Pat. No. 9,187,177.

(51) Int. Cl.
*A47B 46/00* (2006.01)
*B64D 11/00* (2006.01)

(52) U.S. Cl.
CPC ............ *A47B 46/00* (2013.01); *B64D 11/003* (2013.01); *Y10T 29/49826* (2015.01)

(58) Field of Classification Search
CPC ............ E05D 3/18; E05D 1/04; B64D 11/003
USPC ....... 312/245–248, 327, 328, 323, 308, 109, 312/405.1; 244/118.4, 118.1, 118.6; 220/521, 522, 500; 296/37.8; 16/354, 16/361, 348, 357, 358, 360
See application file for complete search history.

(56) References Cited

U.S. PATENT DOCUMENTS

| 443,350 A | 12/1890 | Berners |
| 644,434 A | 2/1900 | Macey |
| 814,355 A | 3/1906 | Carter et al. |

(Continued)

FOREIGN PATENT DOCUMENTS

| DE | 19946629 A1 | 4/2001 |
| DE | 102009051363 A1 | 5/2011 |

(Continued)

OTHER PUBLICATIONS

Extended European Search Report of Application No. 14180807.1; Feb. 16, 2015; 6 pages.

(Continued)

*Primary Examiner* — Janet M Wilkens
(74) *Attorney, Agent, or Firm* — Armstrong Teasdale LLP (57) ABSTRACT

A stowage bin is provided. The stowage bin includes a bucket, a support assembly, and at least one translating pivot mechanism rotatably coupling the support assembly to the bucket, the at least one translating pivot mechanism including a first component integrally formed with the bucket and comprising a first pin and a first slot, and a second component integrally formed with the support assembly and including a second pin and a second slot, wherein the first and second components engage one another such that the first pin is received in the second slot and the second pin is received in the first slot. The first pin is static with respect to the bucket, and the second pin is static with respect to the support assembly.

19 Claims, 6 Drawing Sheets

(56) References Cited

U.S. PATENT DOCUMENTS

| | | | |
|---|---|---|---|
| 1,075,130 | A | 10/1913 | Steeberger |
| 2,206,499 | A | 7/1940 | Dumelin |
| 2,322,286 | A | 6/1943 | Dumelin |
| 2,648,516 | A | 8/1953 | Manetti et al. |
| 3,359,029 | A | 12/1967 | Fernberg |
| 4,375,907 | A | 3/1983 | Vander Kooi et al. |
| 4,606,247 | A | 8/1986 | Graham |
| 4,843,680 | A | 7/1989 | Cress et al. |
| 5,244,269 | A | 9/1993 | Harriehausen et al. |
| 5,383,628 | A | 1/1995 | Harriehausen et al. |
| 5,826,936 | A | 10/1998 | Scordato et al. |
| 6,484,969 | B2 | 11/2002 | Sprenger et al. |
| 6,662,405 | B2 | 12/2003 | Vitry |
| 6,886,781 | B2 | 5/2005 | Lau et al. |
| 7,185,927 | B2 | 3/2007 | Talukdar et al. |
| 7,258,406 | B2 | 8/2007 | Stephan et al. |
| 8,393,663 | B2 | 3/2013 | Gayon et al. |
| 8,590,837 | B2 | 11/2013 | Schneider et al. |
| 9,187,177 | B2 * | 11/2015 | Schmitz ............... B64D 11/003 |
| 2006/0132007 | A1 | 6/2006 | Beckley |
| 2006/0151668 | A1 | 7/2006 | Scown |
| 2007/0018043 | A1 * | 1/2007 | Lamoree ............. B64D 11/003 244/118.1 |
| 2007/0102587 | A1 | 5/2007 | Jones et al. |
| 2007/0228904 | A1 | 10/2007 | Williams |
| 2008/0112754 | A1 | 5/2008 | Schmitz et al. |
| 2013/0076216 | A1 | 3/2013 | Schmitz et al. |

FOREIGN PATENT DOCUMENTS

| | | |
|---|---|---|
| GB | 2437620 A | 10/2007 |
| WO | 2010040776 A2 | 4/2010 |

OTHER PUBLICATIONS

Sclater, N., et al; Mechanisms and Mechanical Devices Sourcebook; Fourth Edition; © 2007 The McGraw-Hill Companies; ISBN-13: 978-0071467612; 553 pages.

Hiscox, G.; 1800 Mechanical Movements, Devices and Appliances; Unabridged Republication of the 1921 sixteenth edition; Dover Publications, Mineola, NY; ISBN 0-486-45743-5; pp. 1-30.

Hiscox, G.; 1800 Mechanical Movements, Devices and Appliances; Unabridged Republication of the 1921 sixteenth edition; Dover Publications, Mineola, NY; ISBN 0-486-45743-5; pp. 31-60.

Hiscox, G.; 1800 Mechanical Movements, Devices and Appliances; Unabridged Republication of the 1921 sixteenth edition; Dover Publications, Mineola, NY; ISBN 0-486-45743-5; pp. 61-90.

Hiscox, G.; 1800 Mechanical Movements, Devices and Appliances; Unabridged Republication of the 1921 sixteenth edition; Dover Publications, Mineola, NY; ISBN 0-486-45743-5; pp. 91-120.

Hiscox, G.; 1800 Mechanical Movements, Devices and Appliances; Unabridged Republication of the 1921 sixteenth edition; Dover Publications, Mineola, NY; ISBN 0-486-45743-5; pp. 121-150.

Hiscox, G.; 1800 Mechanical Movements, Devices and Appliances; Unabridged Republication of the 1921 sixteenth edition; Dover Publications, Mineola, NY; ISBN 0-486-45743-5; pp. 151-185.

Hiscox, G.; 1800 Mechanical Movements, Devices and Appliances; Unabridged Republication of the 1921 sixteenth edition; Dover Publications, Mineola, NY; ISBN 0-486-45743-5; pp. 186-220.

Hiscox, G.; 1800 Mechanical Movements, Devices and Appliances; Unabridged Republication of the 1921 sixteenth edition; Dover Publications, Mineola, NY; ISBN 0-486-45743-5; pp. 221-250.

Hiscox, G.; 1800 Mechanical Movements, Devices and Appliances; Unabridged Republication of the 1921 sixteenth edition; Dover Publications, Mineola, NY; ISBN 0-486-45743-5; pp. 251-280.

Hiscox, G.; 1800 Mechanical Movements, Devices and Appliances; Unabridged Republication of the 1921 sixteenth edition; Dover Publications, Mineola, NY; ISBN 0-486-45743-5; pp. 281-310.

Hiscox, G.; 1800 Mechanical Movements, Devices and Appliances; Unabridged Republication of the 1921 sixteenth edition; Dover Publications, Mineola, NY; ISBN 0-486-45743-5; pp. 311-340.

Hiscox, G.; 1800 Mechanical Movements, Devices and Appliances; Unabridged Republication of the 1921 sixteenth edition; Dover Publications, Mineola, NY; ISBN 0-486-45743-5; pp. 341-375.

Hiscox, G.; 1800 Mechanical Movements, Devices and Appliances; Unabridged Republication of the 1921 sixteenth edition; Dover Publications, Mineola, NY; ISBN 0-486-45743-5; pp. 376-400.

Hiscox, G.; 1800 Mechanical Movements, Devices and Appliances; Unabridged Republication of the 1921 sixteenth edition; Dover Publications, Mineola, NY; ISBN 0-486-45743-5; pp. 401-416.

Brown, H.; Five Hundred and Seven Mechanical Movements: Embracing All Those Which are Most Important in Dynamics, Hydraulics, Hydrostatics, Pneumatics, Steam Engines; 1871; Brown, Coombs & Co.; NY; 122 pages.

Schwarz, 0. et al; Pictorial Handbook of Technical Devices; © 1971; Chemical Publishing Co., Inc.; NY; ISBN 13-:978-0820602349; 605 pages.

Extended European Search Report of application No. EP 12186075.3; Dec. 12, 2012; 5 pages.

* cited by examiner

TRANSLATING STOWAGE BIN AND METHOD OF ASSEMBLY

CROSS-REFERENCE TO RELATED APPLICATIONS

This application is a continuation-in-part and claims priority to U.S. patent application Ser. No. 13/971,552 filed on Aug. 20, 2013 for "TRANSLATING STOWAGE BIN AND METHOD OF ASSEMBLY", which is hereby incorporated by reference in its entirety.

BACKGROUND

The field of the disclosure relates generally to stowage bins, and, more particularly, to aircraft stowage bins and methods of assembling the same.

Vehicles, such as commercial aircraft, generally include stowage bins for storing the luggage of passengers and crew members. As demand for stowage space increases, increasingly larger stowage bins have been designed. Although larger stowage bins are capable of storing more luggage, at least some known larger stowage bins require a greater force to open or close the bins due to their increased size and thus may be difficult for passengers to use.

Further, in a closed position, to facilitate maximizing cabin space, it is desirable that a stowage bin be positioned as high within the cabin as possible. In contrast, in an open position, it is desirable that the stowage bin be positioned as low as possible to enable individuals to insert luggage into the bin and remove luggage from the bin.

BRIEF DESCRIPTION

In one aspect, a stowage bin is provided. The stowage bin includes a bucket, a support assembly, and at least one translating pivot mechanism rotatably coupling the support assembly to the bucket, the at least one translating pivot mechanism including a first component integrally formed with the bucket and comprising a first pin and a first slot, and a second component integrally formed with the support assembly and including a second pin and a second slot, wherein the first and second components engage one another such that the first pin is received in the second slot and the second pin is received in the first slot. The first pin is static with respect to the bucket, and the second pin is static with respect to the support assembly.

In another aspect, an apparatus is provided. The apparatus includes a first object, a second object, and at least one translating pivot mechanism rotatably coupling the first object to the second object, the at least one translating pivot mechanism including a first component integrally formed with the first object and including a first pin and a first slot, and a second component integrally formed with the second object and including a second pin and a second slot, wherein the first and second components engage one another such that the first pin is received in the second slot and the second pin is received in the first slot. The first pin is static with respect to the first object, and the second pin is static with respect to the second object.

In yet another aspect, a method of assembling a stowage bin is provided. The method includes integrally forming a first component with a bucket, wherein the first component includes a first pin and a first slot, integrally forming a second component with a support assembly, wherein the second component includes a second pin and a second slot, and rotatably coupling the bucket to the support assembly by engaging the first and second components, wherein the first and second components engage one another such that the first pin is received in the second slot and the second pin is received in the first slot. The first pin is static with respect to the bucket, and the second pin is static with respect to the support assembly.

DETAILED DESCRIPTION

The systems and methods described herein provide a translating pivot mechanism for coupling a bucket to a support assembly. The translating pivot mechanism includes a first component having a first pin and a first slot, and a second component having a second pin and a second slot. The first and second components engage one another such that the first pin is received in the second slot and the second pin is received in the first slot. By coupling the bucket to the support assembly using the translating pivot mechanism, the bucket translates relative to the support assembly when it is rotated relative to the support assembly.

Figure 1:
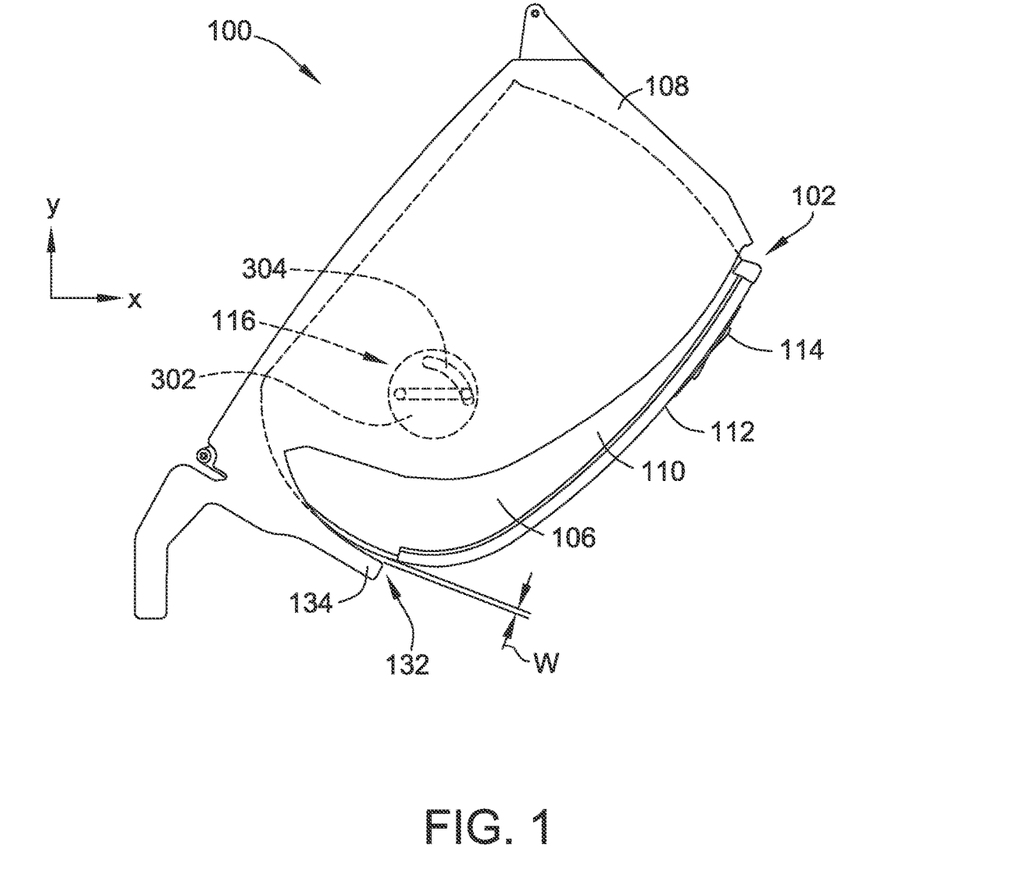
FIG. 1 is a side view of an exemplary stowage bin in a closed position.
Figure 2:
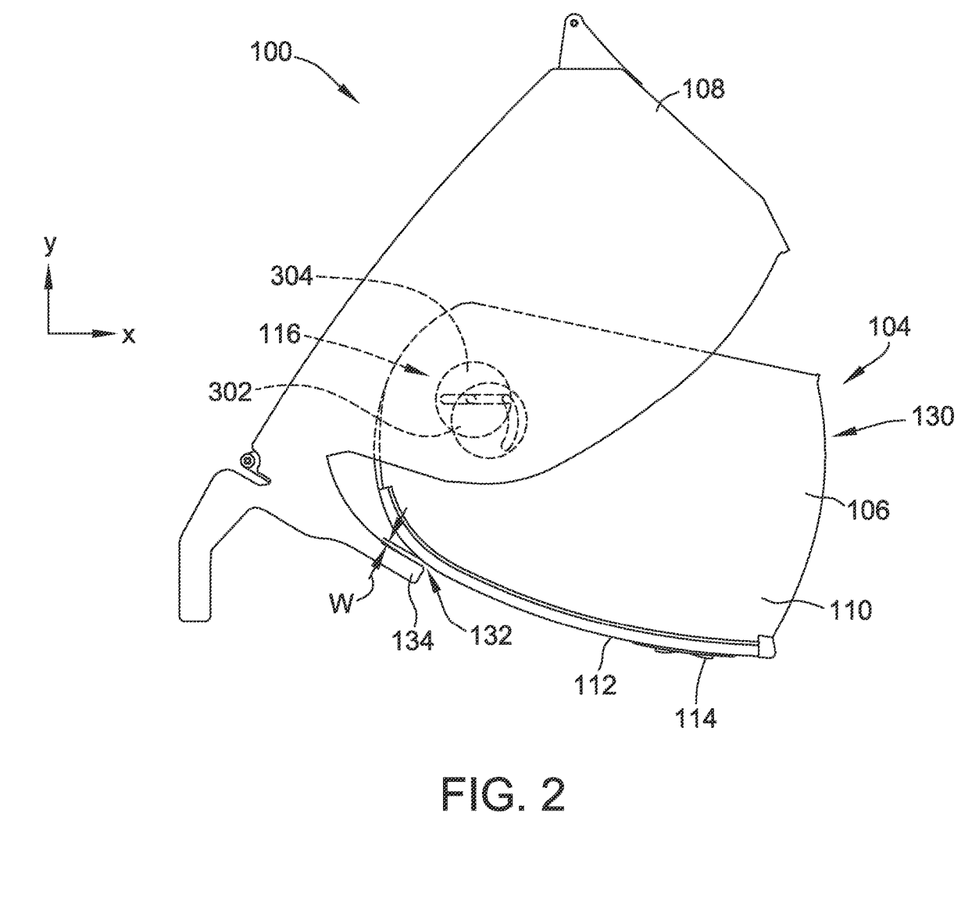
FIG. 2 is a side view of the stowage bin shown in FIG. 1 in an open position.

FIG. 1 is a side view of an exemplary stowage bin 100 in a closed position 102. FIG. 2 is a side view of stowage bin 100 in an open position 104. In the exemplary implementation, stowage bin 100 includes a bucket 106 and a support assembly 108. Bucket 106 includes a pair of side panels 110 and a door 112 that extends between side panels 110. Door 112 includes a handle 114 that enables a user to selectively open and close stowage bin 100.

To move stowage bin 100 between closed and open positions 102 and 104, respectively, bucket 106 is rotatably coupled to support assembly 108. More specifically, each side panel 110 of bucket 106 is rotatably coupled to support assembly 108 by a translating pivot mechanism 116, as described herein. For clarity, only one translating pivot mechanism 116 is shown in FIGS. 1 and 2. In open position 104, a passenger can load luggage into and/or remove luggage from stowage bin 100. When the passenger is finished loading and/or removing luggage, bucket 106 is rotated to closed position 102, such that any luggage therein is stored in stowage bin 100.

As bucket 106 is opened or closed, translating pivot mechanism 116 causes bucket 106 to translate with respect to support assembly 108. More specifically, as bucket 106 is rotated from closed position 102 to open position 104, bucket 106 translates outward (i.e., in a positive x-direction) and downward (i.e., in a negative y-direction) relative to support assembly 108. Similarly, as bucket 106 is rotated from open position 104 to closed position 102, bucket 106 translates inward (i.e., in a negative x-direction) and upward (i.e., in a positive y-direction) with respect to support assembly 108.

In the exemplary implementation, in closed position 102, bucket 106 is positioned higher on support assembly 108 than in open position 104, with respect to, for example, an aircraft cabin floor (not shown). Accordingly, when moving from closed position 102 to open position 104, bucket 106 lowers with respect to support assembly 108. As such, an access opening 130 of stowage bin 100 is larger than if translating pivot mechanism 116 did not cause bucket 106 to translate with respect to support assembly 108. The larger access opening 130 enables passengers to more easily and/or more efficiently load and/or remove luggage.

Moreover, the translation of bucket 106 shifts a center of gravity of bucket 106. Specifically, the center of gravity shifts based on lateral movement (i.e., movement along the x-axis) of bucket 106. Accordingly, because of the shifted center of gravity, the force required to rotate bucket 106 from open position 104 to closed position 102 is reduced.

An interference gap 132 is defined between a lower lip 134 of support assembly 108 and door 112. In the exemplary implementation, as bucket 106 is rotated with respect to support assembly 108, interference gap 132 is maintained at a constant width W. Because interference gap 132 is maintained at a constant width W, objects and/or passenger appendages (e.g., fingers, hands) are prevented from interfering and being pinched between bucket 106 and lower lip 134 as bucket 106 rotates.

The translation of bucket 106 between closed position 102 and open position 104 is accomplished using translating pivot mechanisms 116. In the exemplary implementation, stowage bin 100 includes two translating pivot mechanisms 116. Alternatively, stowage bin 100 may include any number of translating pivot mechanisms 116 that enables stowage bin 100 to function as described herein.

Figure 3:
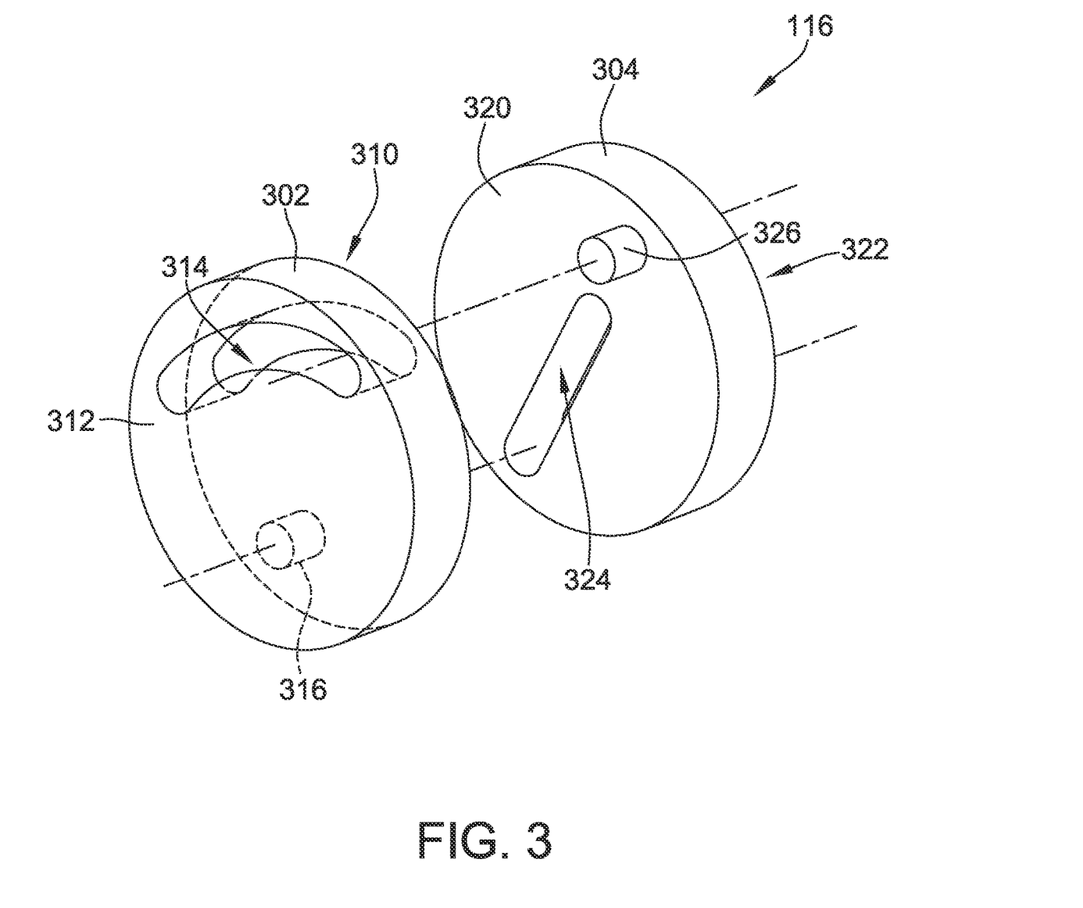
FIG. 3 is a perspective exploded view of a translating pivot mechanism that may be used with the stowage bin shown in FIGS. 1 and 2.

FIG. 3 is a perspective exploded view of translating pivot mechanism 116. Translating pivot mechanism 116 includes a first component 302 and a second component 304 that are coupled to one another, as described herein. In the exemplary implementation, first component 302 is securely coupled (e.g., bonded, adhered, fastened using a fastening device, etc.) to bucket side panel 110 (shown in FIG. 1), such that when bucket 106 rotates, first component 302 rotates. Second component 304 is securely coupled to support assembly 108 (shown in FIG. 1), such that when bucket 106 rotates, second component 304 does not rotate. Alternatively, first component 302 is integrally formed with bucket side panel 110 forming a single, unitary component, and second component 304 is integrally formed with support assembly 108 forming a single, unitary component. The bucket side panel-first component assembly and the support assembly-second component assembly may be formed in any manufacturing process that enables stowage bin 100 to function as described herein, such as, but not limited to, a molding process, a drawing process, or a machining process. As such, the number of parts used in stowage bin 100 and the amount of time for assembling stowage bin 100 is reduced.

In the exemplary implementation, first and second components 302 and 304 are substantially disc-shaped, and are substantially similar in size. Alternatively, first and second components 302 and 304 may have any shape that enables translating pivot mechanism 116 to function as described herein. First and second components 302 and 304 are fabricated from a relatively high-strength polymer, such as nylon, polypropylene, polyethylene, and/or polystyrene, in the exemplary implementation. Alternatively, first and second components 302 and 304 may be made of any material that enables translating pivot mechanism 116 to function as described herein.

First component 302 includes an inner planar surface 310 and an outer planar surface 312 opposite inner planar surface 310. First component outer planar surface 312 is fixedly coupled to bucket side panel 110. A first slot 314 is defined in first component 302 and extends from inner planar surface 310 to outer planar surface 312. In the exemplary implementation, first slot 314 is arcuate. Alternatively, first slot 314 may have any configuration that enables translating pivot mechanism 116 to function as described herein. For example, in some implementations, first slot 314 is linear. First component 302 includes a first pin 316 that extends from inner planar surface 310. First pin 316 engages second component 304, as described herein.

Second component 304 includes an inner planar surface 320 and an outer planar surface 322 opposite inner planar surface 320. Second component outer planar surface 322 is fixedly coupled to support assembly 108. A second slot 324 is defined in second component 304 and extends from inner planar surface 320 to outer planar surface 322. In the exemplary implementation, second slot 324 is linear. Alternatively, second slot 324 may have any configuration that enables translating pivot mechanism 116 to function as described herein. For example, in some implementations, second slot 324 is arcuate. Second component 304 includes a second pin 326 that extends from inner planar surface 310.

In an alternative implementation, as described above, bucket side panel 110 includes first component 302 formed integrally therewith, and support assembly 108 includes second component 304 formed integrally therewith. More specifically, outer planar surface 312 is integrated with an inner surface of bucket side panel 110 when first component 302 is formed integrally with bucket side panel 110. Likewise, outer planar surface 322 is integrated with an outer surface of support assembly 108 when second component 304 is formed integrally with support assembly 108.

First and second components 302 and 304 engage one another using first and second slots 314 and 324 and first and second pins 316 and 326. Specifically, first pin 316 is received in second slot 324, and second pin 326 is received in first slot 314. Accordingly, when first and second components 302 and 304 are coupled to one another, first pin 316 is constrained to translate within second slot 324, and second pin 326 is constrained to translate within first slot 314.

The engagement between first and second components 302 and 304 causes first component 302 to translate when first component 302 is rotated relative to second component 304. Accordingly, bucket 106, which is securely coupled to first component 302, translates with respect to support assembly 108, which is securely coupled to second component 304.

Figure 4:
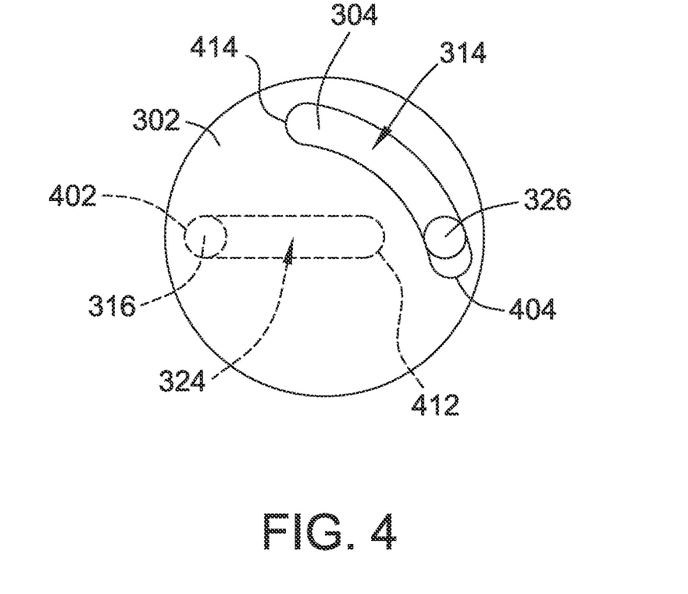
FIG. 4 is a side view of the translating pivot mechanism shown in FIG. 3 in the closed position.
Figure 5:
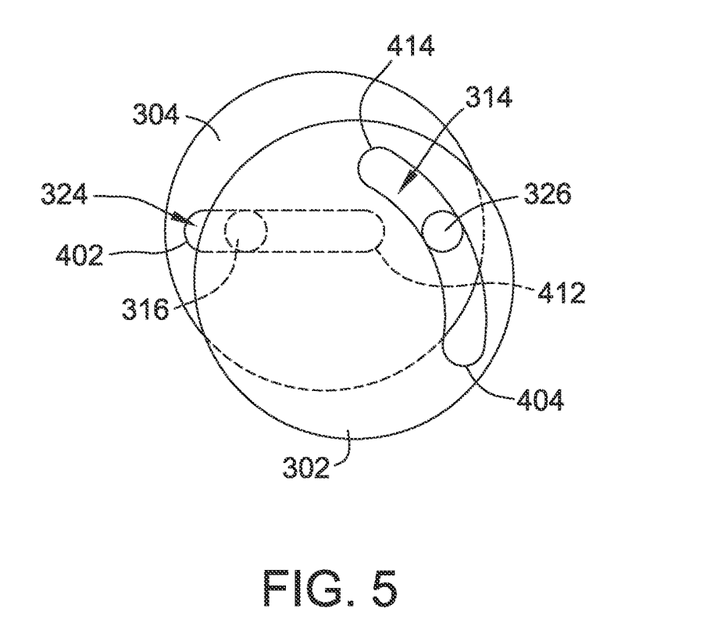
FIG. 5 is a side view of the translating pivot mechanism shown in FIG. 3 in an intermediate position.
Figure 6:
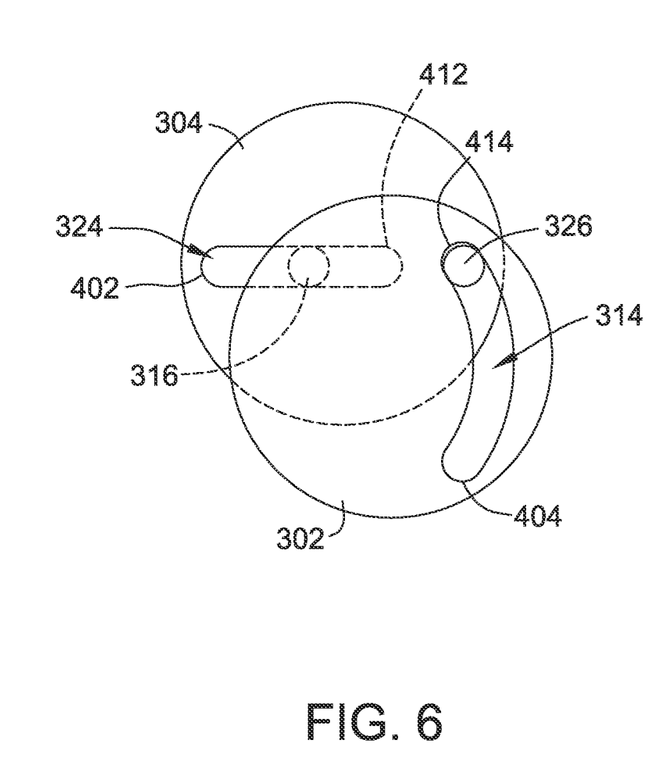
FIG. 6 is a side view of the translating pivot mechanism shown in FIG. 3 in the open position.

FIG. 4 shows translating pivot mechanism 116 when bucket 106 is in closed position 102, FIG. 5 shows translating pivot mechanism 116 when bucket 106 is in an intermediate position between closed position 102 and open position 104, and FIG. 6 shows translating pivot mechanism 116 when bucket 106 is in open position 104.

As shown in FIG. 4, in closed position 102, first component 302 is substantially aligned with second component 304. Further, first pin 316 is positioned proximate a first end 402 of second slot 324, and second pin 326 is positioned proximate a first end 404 of first slot 314.

As shown in FIG. 5, as bucket 106 is rotated relative to support assembly 108, first pin 316 translates within second slot 324 away from first end 402 towards a second end 412 of second slot 324. Further, second pin 326 translates within first slot 314 away from first end 404 towards a second end 414 of first slot 314.

As shown in FIG. 6, in open position 104, first pin 316 is positioned closer to second slot second end 412 than in closed position 102 and the intermediate position, and second pin 326 is positioned proximate first slot second end 414. Further, in moving from closed position 102 to open position 104, first component 302 has translated and rotated relative to second component 304.

In some implementations first slot first end 404 and first slot second end 414 function as stops for second pin 326, and second slot first end 402 and second slot second end 412 function as stops for first pin 316. That is, ends 402, 404, 412, and 414 limit the range of motion of first component 302 with respect to second component 304, and accordingly, limit the range of motion of bucket 106 with respect to support assembly 108.

The shapes and positions of slots 314 and 324 and the shapes and positions of pins 316 and 326 as shown in the figures are exemplary. That is, the shapes and positions of slots 314 and 324 and the shapes and positions of pins 316 and 326 may be varied to generate different types of translation and/or rotation of first component 302 with respect to second component 304. For example, slots 314 and 324 and pins 316 and 326 may be configured to provide a relatively smooth translation of first component 302 with respect to second component 304, or slots 314 and 324 and pins 316 and 326 may be configured to provide a relatively abrupt, disjointed translation of first component 302 with respect to second component 304. Further, slots 314 and 324 may have more or less curvature than that shown in the figures.

First component 302 and second component 304 are not limited to use with a stowage bin. Rather, first and second components 302 and 304 may be utilized to rotatably couple a first object to a second object for a variety of applications (e.g., coupling a door to a housing).

Figure 7:
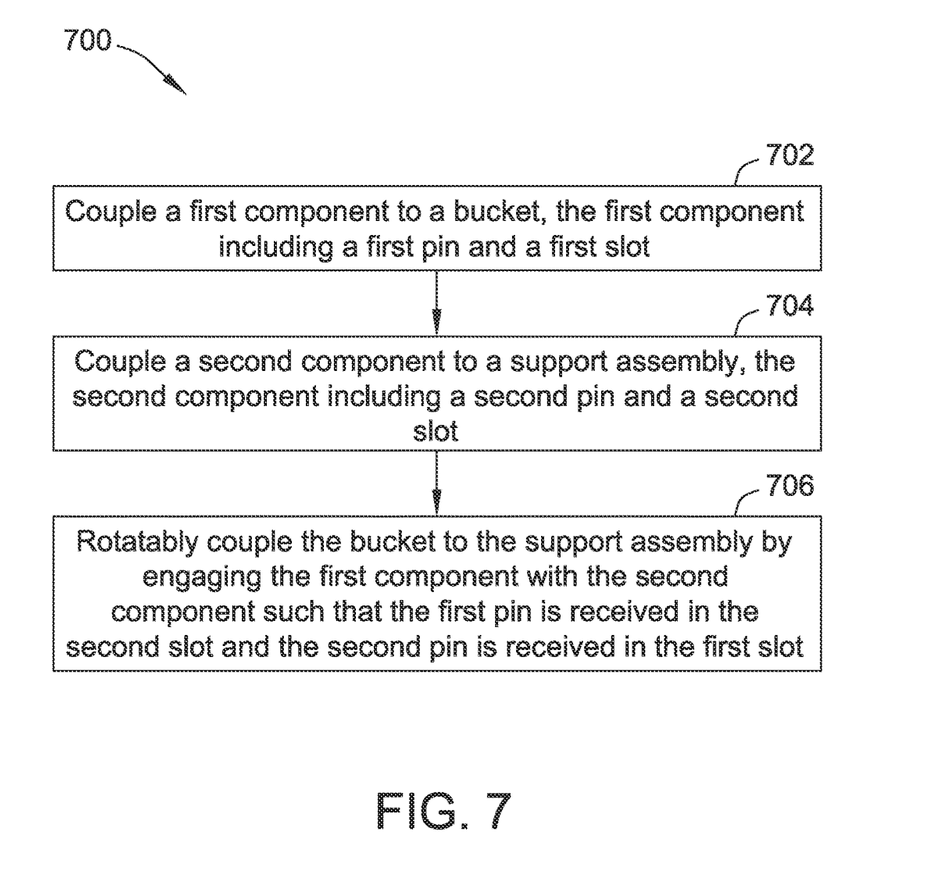
FIG. 7 is a flowchart of an exemplary method that may be used to assemble the stowage bin shown in FIG. 1.

FIG. 7 is a flowchart of an exemplary method 700 for assembling a stowage bin, such as stowage bin 100 (shown in FIG. 1). In step 702, a first component, such as first component 302 (shown in FIG. 3) is coupled to a bucket, such as bucket 106 (shown in FIG. 1). The first component includes a first pin and a first slot, such as first pin 316 and first slot 314 (both shown in FIG. 3).

In step 704, a second component, such as second component 304 (shown in FIG. 3) is coupled to a support assembly, such as support assembly 108 (shown in FIG. 1. The second component includes a second pin and a second slot, such as second pin 326 and second slot 324 (both shown in FIG. 3).

In step 706, the bucket is rotatably coupled to the support assembly. More specifically, to rotatably couple the bucket to the support assembly, the first component engages the second component such that the first pin is received in the second slot and the second pin in received in the first slot. Due to the configuration of the first and second components, when the bucket is rotated relative to the support assembly, the bucket translates relative to the support assembly.

The implementations described herein provide a translating pivot mechanism for coupling a bucket to a support assembly. The translating pivot mechanism includes a first component having a first pin and a first slot, and a second component having a second pin and a second slot. The first and second components engage one another such that the first pin is received in the second slot and the second pin is received in the first slot. By coupling the bucket to the support assembly using the translating pivot mechanism, the bucket translates relative to the support assembly when it is rotated relative to the support assembly.

The implementations described herein provide improvements over at least some known stowage bins. As compared to at least some known stowage bins, the stowage bins described herein have a wider access opening in an open position. As a result, the implementations described herein provide increased access for passengers. Moreover, as compared to at least some known stowage bins, the stowage bins described herein require less force to close, as the center of gravity of the bucket shifts due to the translation of the bucket relative to the support assembly. Furthermore, the stowage bins described herein maintain a constant interference gap between the bucket and the support assembly during rotation to prevent pinching objects between the bucket and support assembly.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A stowage bin comprising:
   a bucket;
   a support assembly; and
   at least one translating pivot mechanism rotatably coupling said support assembly to said bucket, said at least one translating pivot mechanism comprising:
      a first component integrally formed with said bucket and comprising a first pin and a first slot, wherein said first pin is static with respect to said bucket; and
      a second component integrally formed with said support assembly and comprising a second pin and a second slot, wherein said second pin is static with respect to said support assembly, and wherein said first and second components engage one another such that said first pin is received in said second slot and said second pin is received in said first slot.

2. A stowage bin in accordance with claim 1, wherein said first and second components engage one another such that when said first component is rotated relative to said second component, said first component translates relative to said second component.

3. A stowage bin in accordance with claim 1, wherein at least one of said first and second slots is substantially arcuate.

4. A stowage bin in accordance with claim 1, wherein at least one of said first and second slots is substantially linear.

5. A stowage bin in accordance with claim 1, wherein said first slot is substantially arcuate and said second slot is substantially linear.

6. A stowage bin in accordance with claim 1, wherein said first and second components are substantially disc-shaped.

7. A stowage bin in accordance with claim 1, wherein said first and second components are substantially similar in size.

8. A stowage bin in accordance with claim 1, wherein said bucket further comprises:
   a first side panel;
   a second side panel; and a door extending between said first and second side panels, wherein an interference gap is defined between said door and a lip of said support assembly.

9. A stowage bin in accordance with claim 8, wherein said bucket is configured such that a width of said interference gap is maintained at a substantially constant width as said bucket is rotated relative to said support assembly.

10. A stowage bin in accordance with claim 1, wherein said at least one translating pivot mechanism comprises two translating pivot mechanisms.

11. An apparatus comprising:
a first object;
a second object; and
at least one translating pivot mechanism rotatably coupling said first object to said second object, said at least one translating pivot mechanism comprising:
a first component integrally formed with said first object and comprising a first pin and a first slot, wherein said first pin is static with respect to said first object; and
a second component integrally formed with said second object and comprising a second pin and a second slot, wherein said second pin is static with respect to said second object, and wherein said first and second components engage one another such that said first pin is received in said second slot and said second pin is received in said first slot, wherein at least one of said first and second slots is substantially arcuate.

12. An apparatus in accordance with claim 11, wherein said first and second components engage one another such that when said first component is rotated relative to said second component, said first component translates relative to said second component.

13. An apparatus in accordance with claim 11, wherein at least one of said first and second slots is substantially linear.

14. An apparatus in accordance with claim 11, wherein said first slot is substantially arcuate and said second slot is substantially linear.

15. A method of assembling a stowage bin, said method comprising:
integrally forming a first component with a bucket, wherein the first component includes a first pin and a first slot, wherein the first pin is static with respect to the bucket;
integrally forming a second component with a support assembly, wherein the second component includes a second pin and a second slot, wherein the second pin is static with respect to the support assembly; and
rotatably coupling the bucket to the support assembly by engaging the first and second components, wherein the first and second components engage one another such that the first pin is received in the second slot and the second pin is received in the first slot.

16. A method in accordance with claim 15, further comprising rotating the bucket relative to the support assembly such that the bucket translates relative to the support assembly.

17. A method in accordance with claim 15, wherein integrally forming a first component with a bucket comprises integrally forming a first component including a substantially arcuate slot.

18. A method in accordance with claim 15, wherein integrally forming a second component with a support assembly comprises integrally forming a second component including a substantially linear slot.

19. A method in accordance with claim 15, further comprising fabricating the first and second components from a high-strength polymer.

* * * * *